(12) United States Patent
Kapas et al.

(10) Patent No.: US 9,383,273 B2
(45) Date of Patent: Jul. 5, 2016

(54) MAGNETIC TORQUE SENSOR PACKAGING FOR AUTOMATIC TRANSMISSIONS

(75) Inventors: Nimrod Kapas, Dearborn, MI (US); Joseph F. Kucharski, Livonia, MI (US); Gregory Michael Pietron, Canton, MI (US); Yuji Fujii, Ann Arbor, MI (US); Steven Adam Hermann, Fenton, MI (US); Jeffrey Edward Maurer, Commerce Township, MI (US); Laurence Andrew Deutsch, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1112 days.

(21) Appl. No.: 13/114,366

(22) Filed: May 24, 2011

(65) Prior Publication Data

US 2012/0297895 A1 Nov. 29, 2012

(51) Int. Cl.
*G01L 3/02* (2006.01)
*G01L 3/10* (2006.01)

(52) U.S. Cl.
CPC ...................... *G01L 3/102* (2013.01)

(58) Field of Classification Search
CPC ..... F16H 61/0213; F16H 61/68; G01L 3/101; G01L 3/10; B62D 5/04
USPC .............. 73/862, 862.193, 862.335, 862.328, 73/862.333
See application file for complete search history.

(56) References Cited

U.S. PATENT DOCUMENTS

| | | | |
|---|---|---|---|
| 4,887,461 A | 12/1989 | Sugimoto et al. | |
| 4,899,597 A | 2/1990 | Yagi et al. | |
| 5,092,182 A | 3/1992 | Ikeda et al. | |
| 5,165,286 A | 11/1992 | Hamamura et al. | |
| 5,493,921 A | 2/1996 | Alasafi et al. | |
| 5,513,965 A * | 5/1996 | Nakamura et al. | 417/462 |
| 5,526,704 A | 6/1996 | Hoshina et al. | |
| 6,260,421 B1 | 7/2001 | Torbjornsson et al. | |
| 6,688,445 B2 | 2/2004 | Otto | |
| 6,698,299 B2 | 3/2004 | Cripe | |
| 6,846,260 B2 | 1/2005 | Horiuchi | |
| 7,243,557 B2 | 7/2007 | May | |
| 7,258,949 B2 | 8/2007 | Frederiksson et al. | |
| 7,491,145 B2 | 2/2009 | Mizon et al. | |
| 7,579,827 B2 | 8/2009 | Burns et al. | |
| 7,685,891 B2 | 3/2010 | May | |
| 2003/0109346 A1* | 6/2003 | Horiuchi | 475/60 |
| 2009/0293642 A1 | 12/2009 | Schmitz | |
| 2010/0043570 A1 | 2/2010 | Grab et al. | |

FOREIGN PATENT DOCUMENTS

| | | |
|---|---|---|
| JP | 63312551 A | 12/1988 |
| JP | 64021255 | 1/1989 |
| JP | 04052537 | 2/1992 |
| JP | 04052538 | 2/1992 |

* cited by examiner

*Primary Examiner* — Harshad R Patel
*Assistant Examiner* — Brandi N Hopkins
(74) *Attorney, Agent, or Firm* — James Dottavio; Brooks Kushman P.C.

(57) ABSTRACT

Designs to package a magneto-elastic torque sensor in an automotive transmission, such as front wheel drive (FWD) automatic transmissions, for volume production applications are provided.

26 Claims, 13 Drawing Sheets

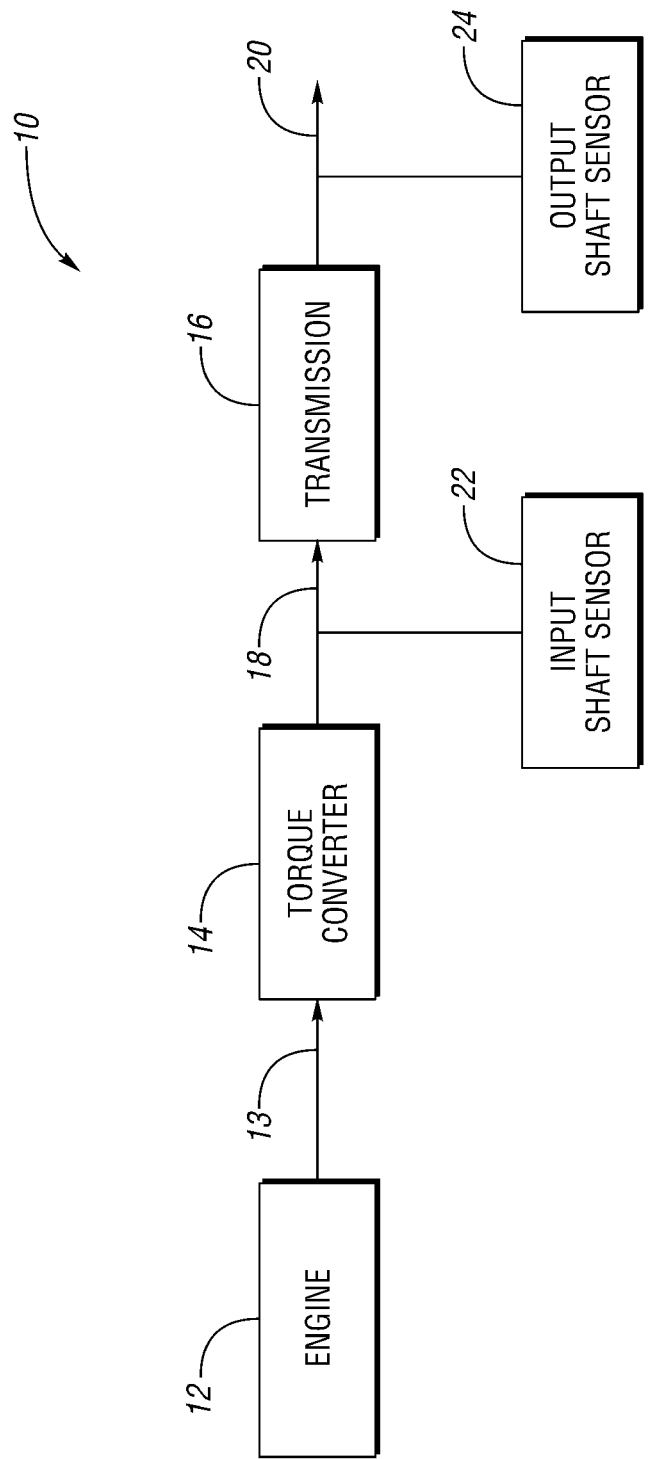

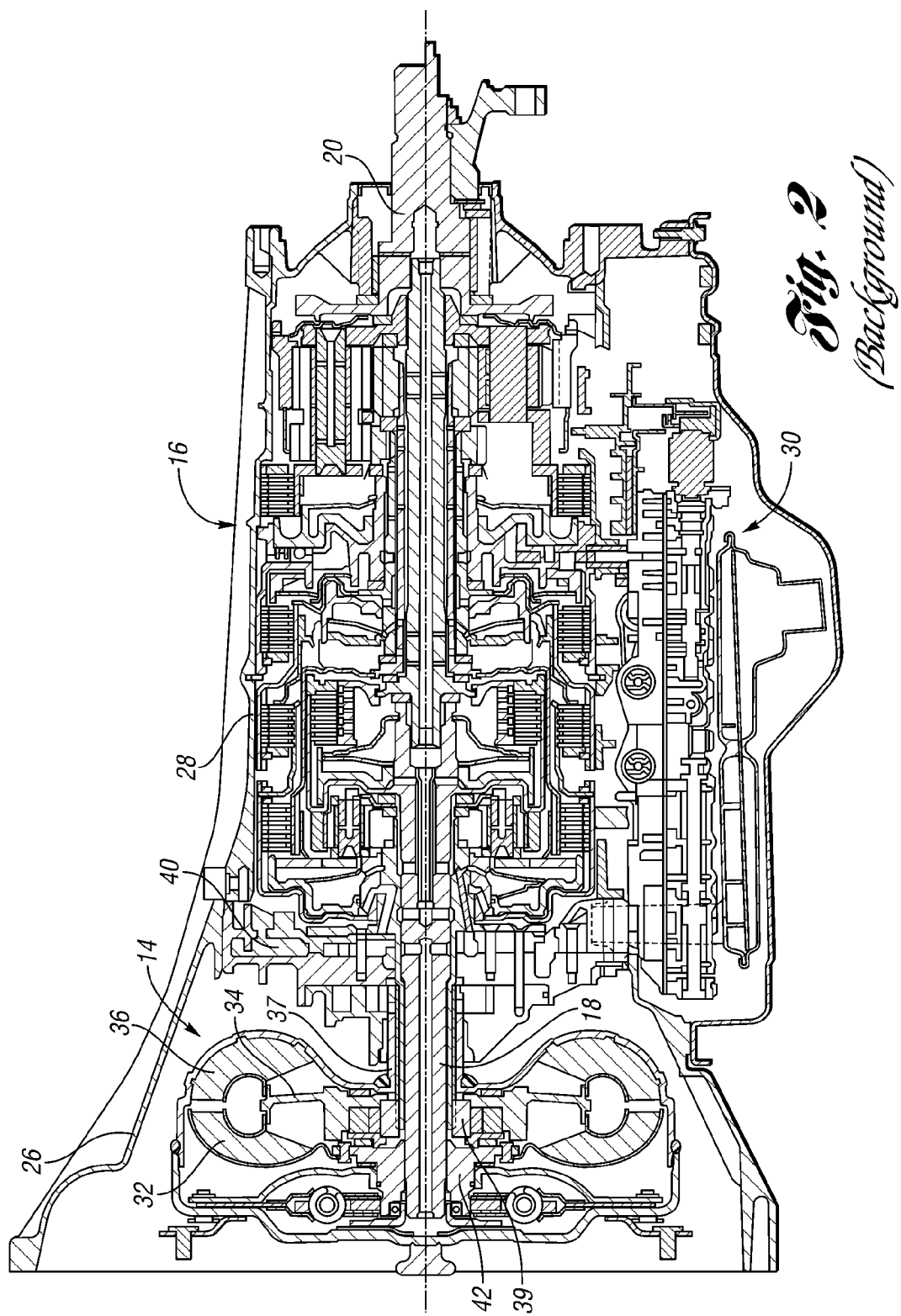
Fig. 2 (Background)

*(Background)*

*(Background)*

*(Background)*

*(Background)*

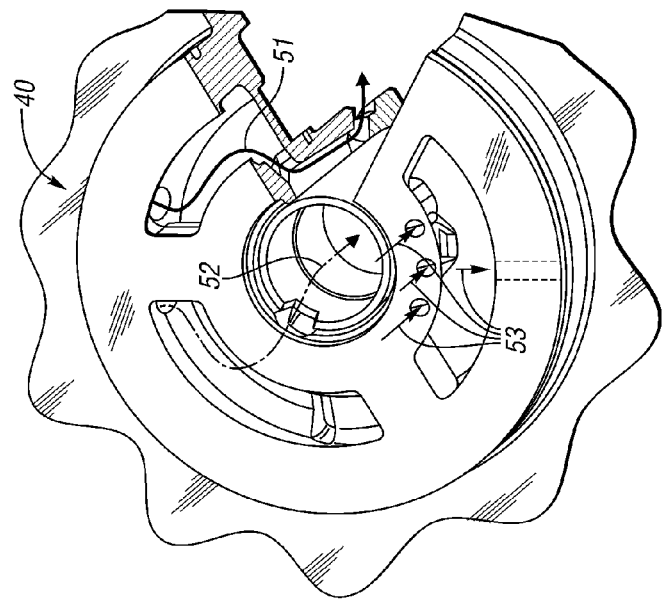
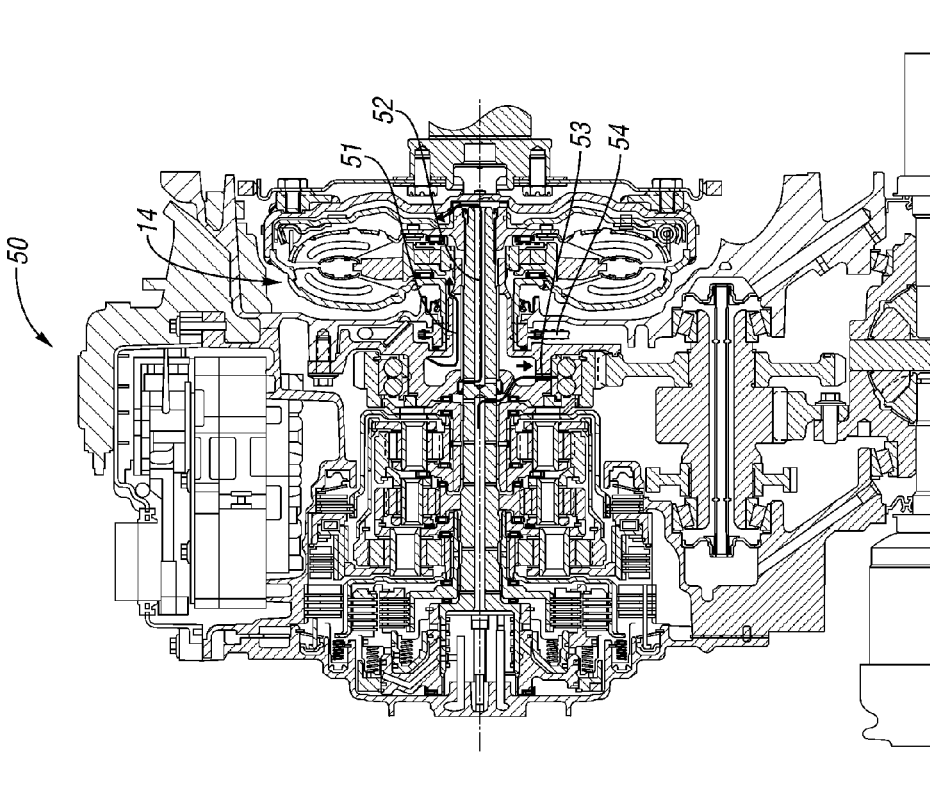
Fig. 5B (Background)
Fig. 5A (Background)

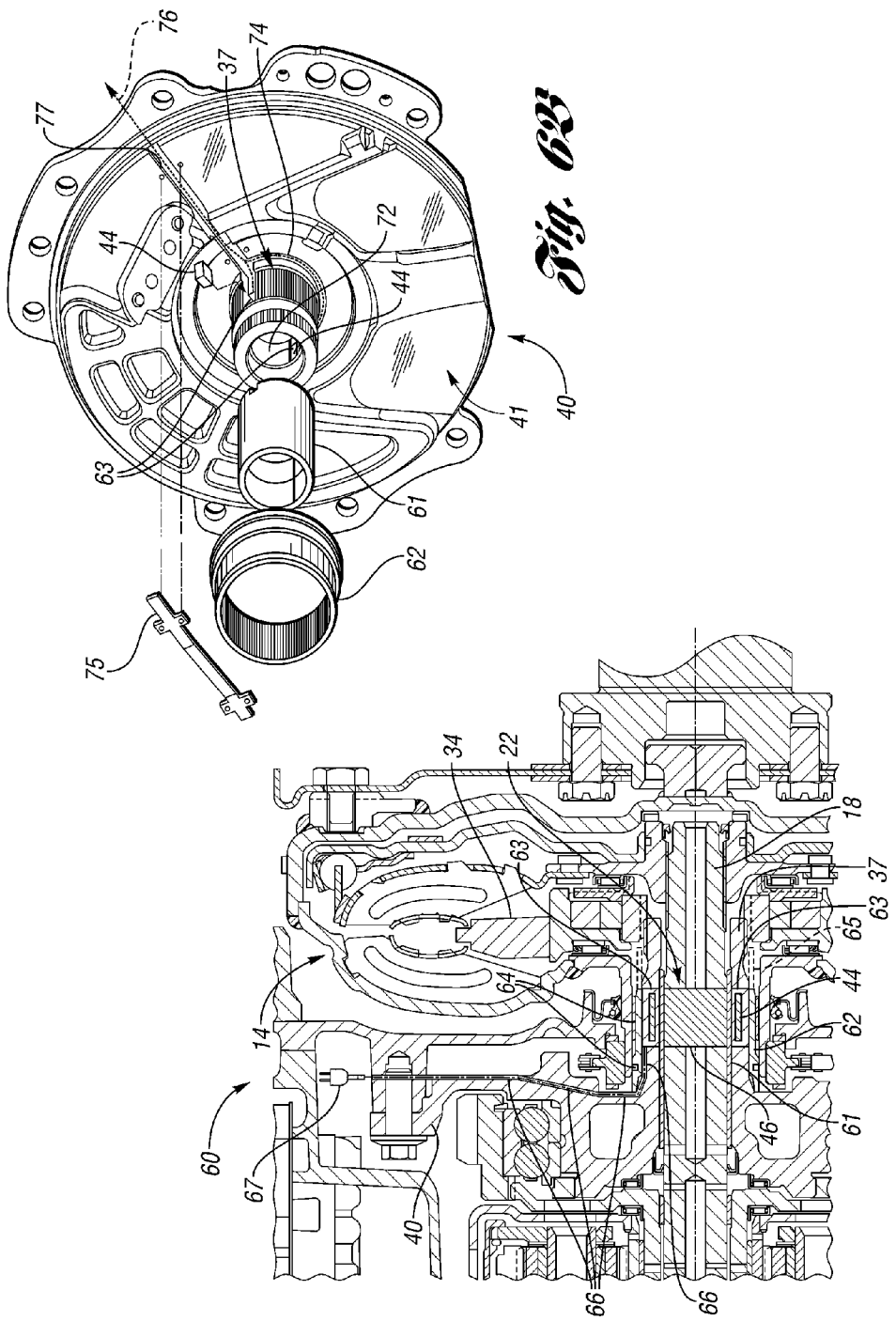

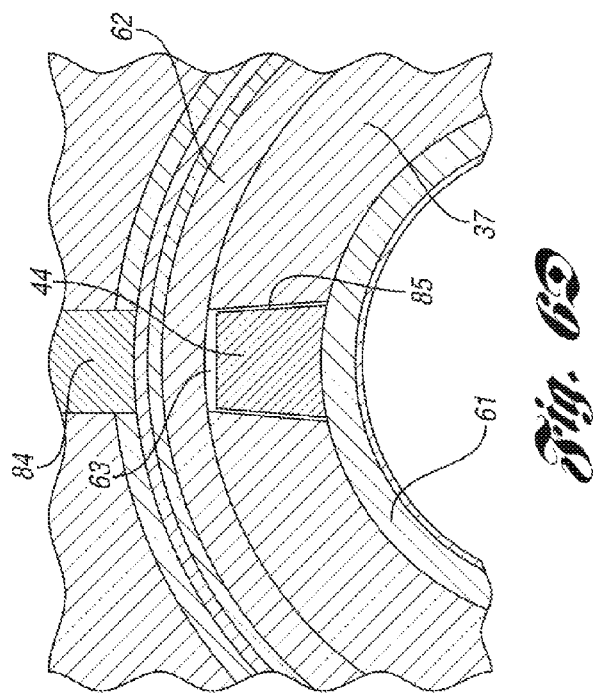
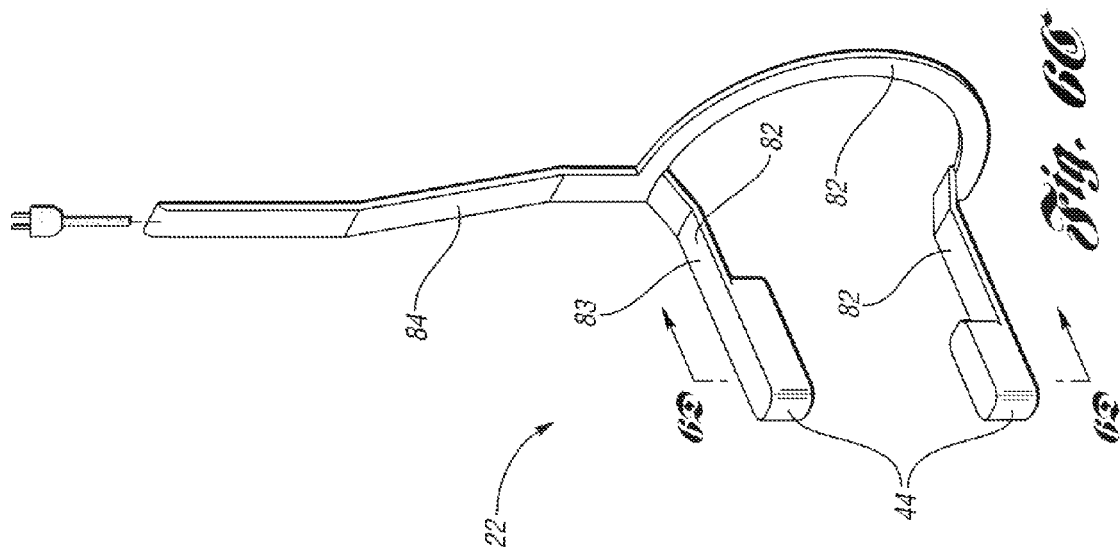

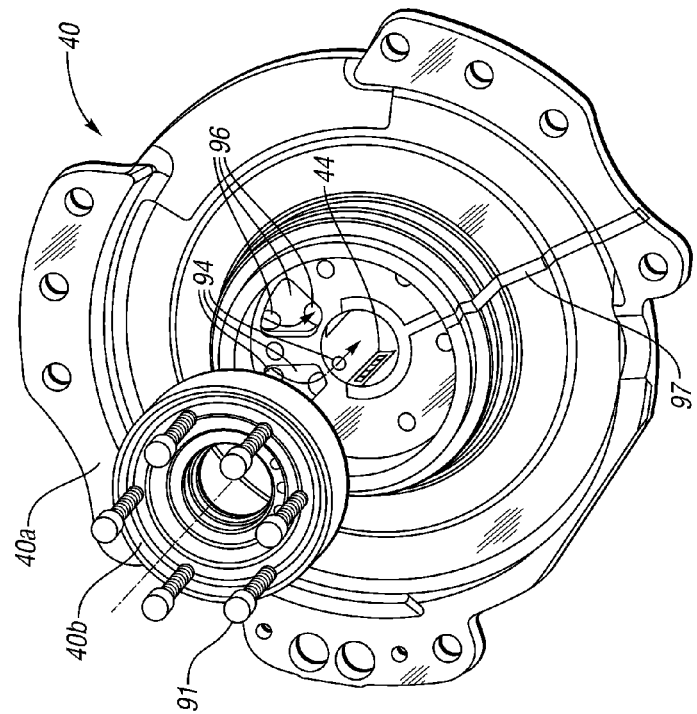
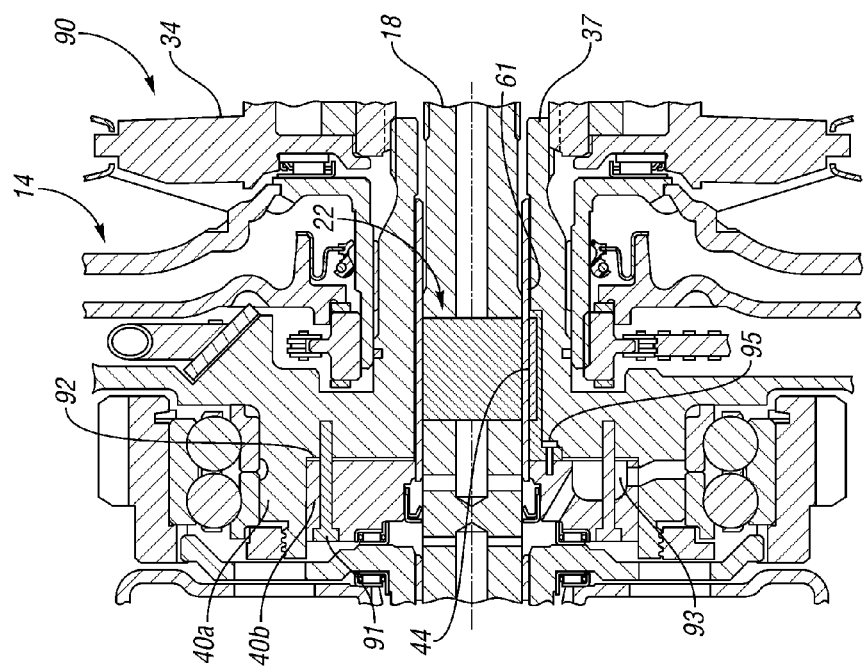
Fig. 7A.
Fig. 7B.

(Background)

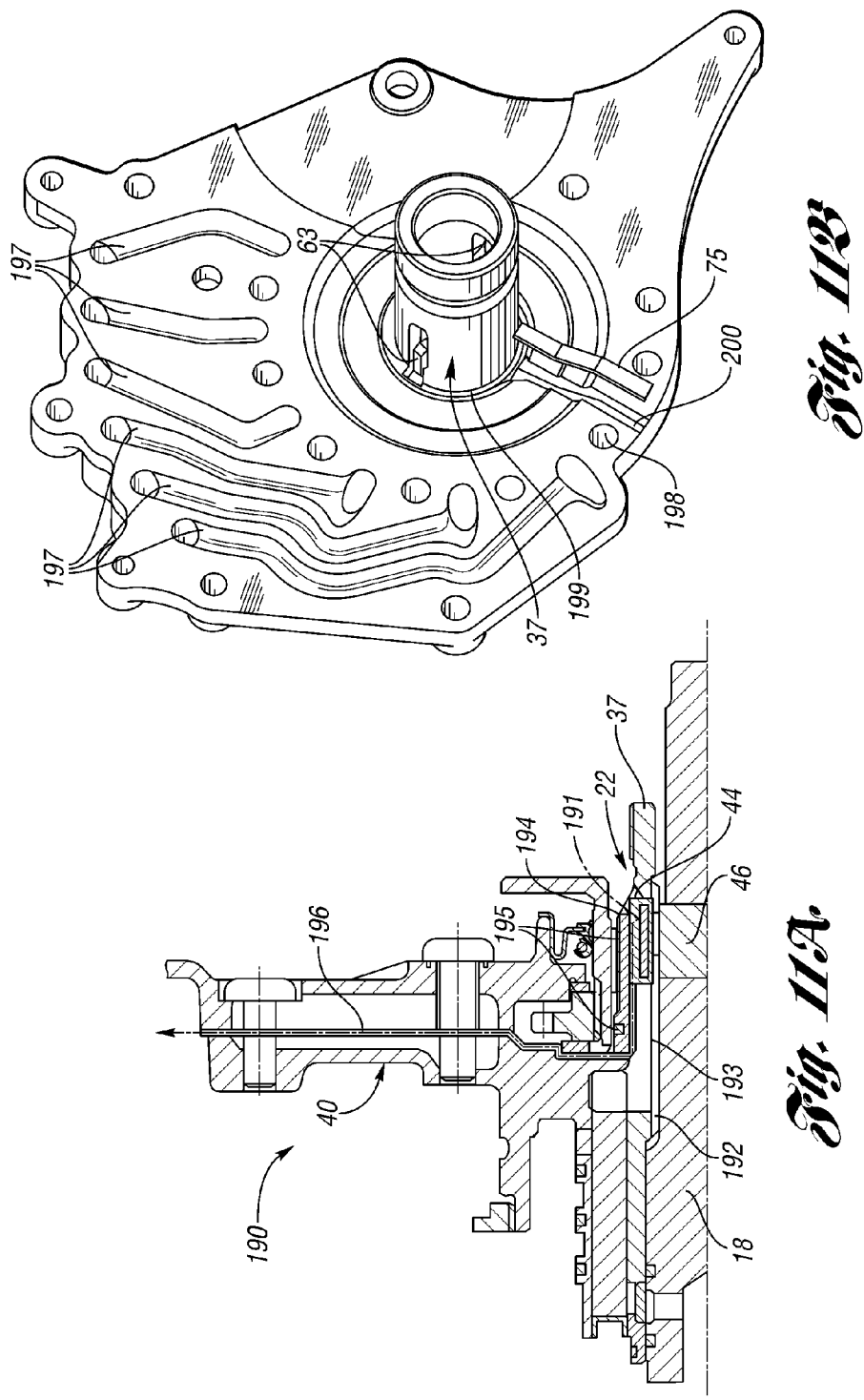

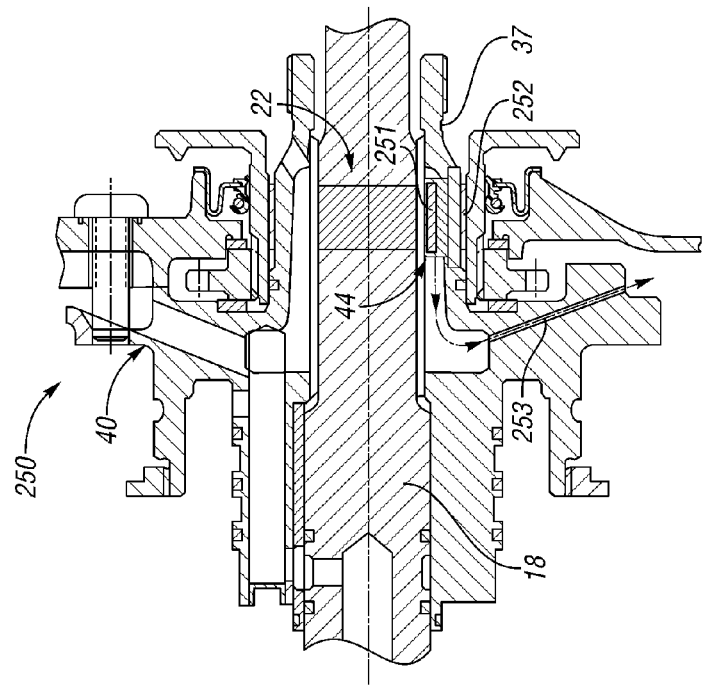
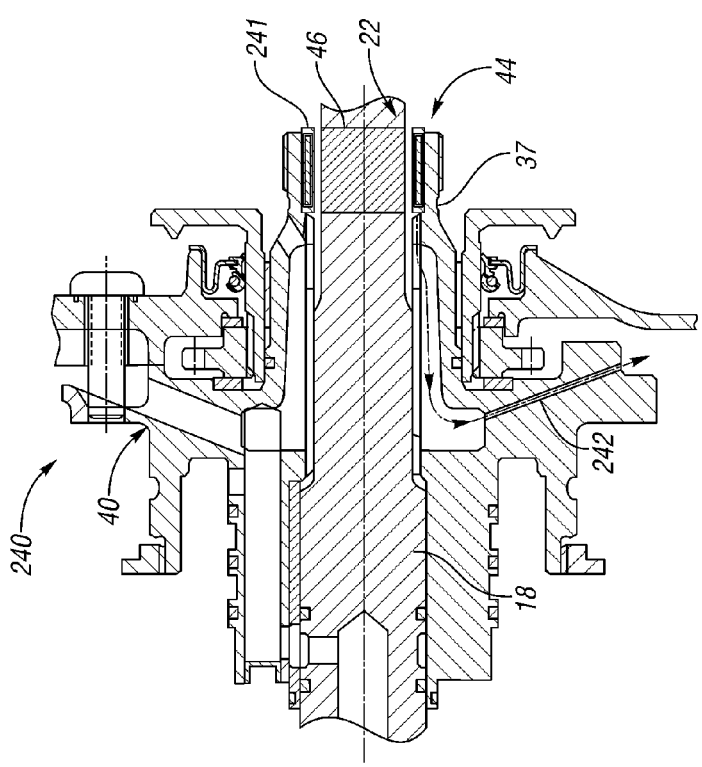

MAGNETIC TORQUE SENSOR PACKAGING FOR AUTOMATIC TRANSMISSIONS

TECHNICAL FIELD

The present invention relates to automatic transmissions having magnetic sensors.

BACKGROUND

An automatic transmission of a vehicle includes an input shaft and an output shaft. The input shaft receives an input torque at an input speed from power derived from a power source such as an engine. The transmission converts the input torque at the input speed to an output torque at an output speed. The output shaft transmits the output torque at the output speed to traction wheels of the vehicle in order to propel the vehicle.

The transmission converts the input torque at the input speed to the output torque at the output speed by adjusting a gear ratio (for example, during an up-shift or down-shift) between the input and output shafts. The transmission shifting is accomplished by applying and/or releasing friction elements (such as clutches, band-brakes, etc.) to change speed and torque relationships by altering planetary gear configurations of the transmission. As a result, power flow paths are established and disestablished from the engine to the wheels.

The friction elements must be properly controlled in order to satisfactorily shift the transmission. To this end, information regarding the operation of the transmission is used to control the friction elements. For instance, information indicative of the input torque received by the input shaft and the speed of the input shaft and information such as vehicle speed and throttle opening may be used. Similarly, information indicative of the output torque transmitted by the output shaft and the speed of the output shaft may be used.

Torque and speed of the input shaft and the output shaft are typically estimated based on various available information. One way to avoid estimation is to use a magnetic sensor mounted within the transmission to directly detect the torque and/or speed parameters. However, installation and packaging of such magnetic sensors within limited spaces of the transmission may provide a challenge.

SUMMARY

Embodiments of the present invention are directed to designs for packaging magneto-elastic torque sensors in automatic transmissions for volume production.

In one embodiment, the present invention provides a transmission having an input shaft and a magnetic torque sensor. The input shaft has a magnetized region. The sensor detects torque of the input shaft and is positioned within a portion of a stator tube adjacent to the magnetized region.

In one embodiment, the present invention provides a transmission having first and second stator support parts and a magnetic torque sensor. The first stator support part includes an inner surface encompassing an input shaft having a magnetized region. The inner surface includes a cavity adjacent the magnetized region. The second stator support part includes an inner surface encompassing the input shaft. The second stator support part is attachable to a rear side of the first stator support part. The sensor detects torque of the input shaft and is positioned within the cavity adjacent the magnetized region.

In one embodiment, the present invention provides a transmission having a stator tube and a magnetic torque sensor. The stator tube includes an inner surface and an outer surface. The inner surface encompasses an input shaft having a magnetized region with the inner surface facing the input shaft. The stator tube further has a cut-out portion adjacent the magnetized region and extending between the outer and inner surfaces. The sensor detects torque of the input shaft and is positioned within the cut-out portion and is affixed to the stator tube to be adjacent the magnetized region.

BRIEF DESCRIPTION OF THE DRAWINGS

FIG. 1 illustrates a block diagram of a vehicle power-train in accordance with embodiments of the present invention;

FIG. 2 illustrates a cross-sectional view of the torque converter and the transmission of the power-train shown in FIG. 1 in which the transmission lacks both of an input shaft sensor and an output shaft sensor;

FIG. 5A illustrates a cross-sectional view of a conventional front-wheel drive (FWD) automatic transmission in which the transmission lacks torque sensing mechanisms;

FIG. 5B illustrates an enlarged view of the stator support of the transmission shown in FIG. 5A;

FIG. 6A illustrates a cross-sectional view of an automatic transmission having a magnetic torque sensor packaging design in accordance with a first embodiment of the present invention;

FIG. 6B illustrates an enlarged view of the front side of the stator support of the transmission shown in FIG. 6A;

FIG. 6C illustrates an enlarged view of the magnetic torque sensor of the transmission shown in FIG. 6A;

FIG. 6D illustrates a cross-sectional view of the area of the transmission shown in FIG. 6A immediate to one of the sensor housings of the sensor;

FIG. 7A illustrates a cross-sectional view of an automatic transmission having a magnetic torque sensor packaging design in accordance with a second embodiment of the present invention;

FIG. 7B illustrates an enlarged view of the rear side of the stator support of the transmission shown in FIG. 7A;

FIG. 11A illustrates a cross-sectional view of an automatic transmission having a magnetic torque sensor packaging design in accordance with a fifth embodiment of the present invention;

FIG. 11B illustrates an enlarged view of the front side of the stator support of the transmission shown in FIG. 11A;

FIG. 15 illustrates a cross-sectional view of an automatic transmission having a magnetic torque sensor packaging design in accordance with a ninth embodiment of the present invention; and FIG. 16 illustrates a cross-sectional view of an automatic transmission having a magnetic torque sensor packaging design in accordance with a tenth embodiment of the present invention.

DETAILED DESCRIPTION

Figure 3A:
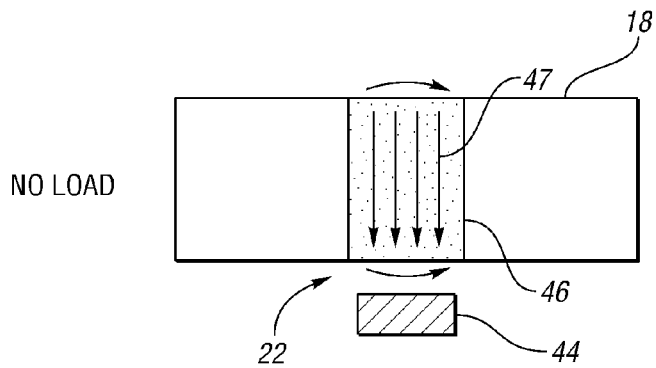
FIGS. 3A, 3B, and 3C illustrate an example of a magnetic torque sensor for detecting torque of a shaft.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a block diagram of a vehicle power-train 10 in accordance with embodiments of the present invention is shown. Power-train 10 includes an engine 12, a torque converter 14, and an automatic transmission 16. Transmission 16 has an input shaft 18 and an output shaft 20. Engine 12 delivers torque to torque converter 14 via crankshaft 13 of engine 12 which is connected to torque converter 14. Torque converter 14 converts the engine torque into an input torque at an input speed and transmits the input torque at the input speed to input shaft 18 of transmission 16. Transmission 16 serves to change a transmission ratio and thus changes the input torque at the input speed into an output torque (for example, increased torque) at an output speed (for example, reduced speed). Transmission 16 transmits the output torque at the output speed to output shaft 20. Output shaft 20 is connected to a vehicle drive-line (not shown) such that the output torque at the output speed may be used to drive wheels of the vehicle.

While not shown herein, the present invention can be used as well in a hybrid power-train that includes, for example, an engine and an electric motor without a torque converter.

Power-train 10 further includes at least one of an input shaft sensor 22 and an output shaft sensor 24. Input shaft sensor 22 is associated with input shaft 18 and is configured to monitor at least one of (input) torque and (input) speed of input shaft 18. Similarly, output shaft sensor 24 is associated with output shaft 20 and is configured to monitor at least one of (output) torque and (output) speed of output shaft 20. Input and output shaft sensors 22 and 24 provide sensor signals indicative of the monitored information to a controller (not shown) for the controller to control operation of transmission 16 accordingly.

Referring now to FIG. 2, with continual reference to FIG. 1, a cross-sectional view of torque converter 14 and transmission 16 is shown. As shown in FIG. 2, torque converter 14 is encased within a torque converter case 26 and transmission 16 is encased within a transmission case 28.

Transmission mechanism 30 changes the input torque at the input speed received by input shaft 18 into an output torque at an output speed transmitted by output shaft 20. As illustrated in the right-hand side of FIG. 2, transmission mechanism 30 uses planetary gear sets. The present invention may be applied to other types of transmission mechanisms including, but not limited to, belt-drive transmissions, dual clutch transmissions, or continuously variable transmissions.

Torque converter 14 includes a turbine 32, a stator 34, and an impeller 36. Impeller 36 is fixedly connected to engine crankshaft 13 such that impeller 36 rotates as crankshaft 13 rotates. Stator 34 is fixed onto the stator shaft 37 (i.e., the stator tube) of a stator support 40 via a one-way clutch 39. Stator support 40 is fixed to transmission case 28. Turbine 32 is mechanically linked via a turbine hub 42 to input shaft 18.

Notably, transmission 16, as shown in FIG. 2, does not have either an input shaft sensor 22 for directly measuring torque and/or speed of input shaft 18 or an output shaft sensor 24 for directly measuring torque and/or speed of output shaft 20.

In accordance with embodiments of the present invention, a transmission is configured with inventive design concepts and features for enabling the packaging of an input shaft sensor 22 and/or an output shaft sensor 24 within the transmission in which sensors 22 and 24 are magnetic sensors. The packaging of an input shaft magnetic sensor 22 within a transmission in accordance with embodiments of the present invention enables direct measurement of torque and/or speed of input shaft 18. Similarly, the packaging of an output shaft magnetic sensor 24 within a transmission in accordance with embodiments of the present invention enables direct measurement of torque and/or speed of output shaft 20.

In some embodiments, sensors 22 and 24 are magnetic torque sensors for monitoring torque of input and output shafts 18 and 20, respectively. Similarly, in some embodiments, sensors 22 and 24 are magnetic speed sensors for monitoring speed of shafts 18 and 20, respectively. Further, in some embodiments, sensors 22 and 24 are magnetic torque and speed sensors for monitoring torque and speed of shafts 18 and 20, respectively.

Magnetic torque and speed sensor technology operates optimally with a free smooth surface area on a shaft with constant diameter and controlled hardness, wherein a part of the shaft is magnetized. The magnetic sensor technology makes use of magnetic flux sensing elements such as fluxgate sensors. The sensing elements are preferably stationary and fixed with respect to the rotating magnetized surface of the shaft. Translation of the shaft in either the axial or radial direction relative to the sensor housing is preferably minimized. As indicated above, conventional transmission designs, such as shown in FIG. 2, may represent a challenge for packaging of magnetic sensors.

Input and output shaft sensors 22 and 24 may be magneto-elastic sensors as described in U.S. Pat. Nos. 6,145,387; 6,047,605; 6,553,847; and 6,490,934. Other magnetic sensors may also be used to enable accurate measurements of torque exerted onto a rotating shaft and rotating speed of the shaft without physical contact between a magnetic flux sensing element of the sensor and the shaft.

Figure 3B:
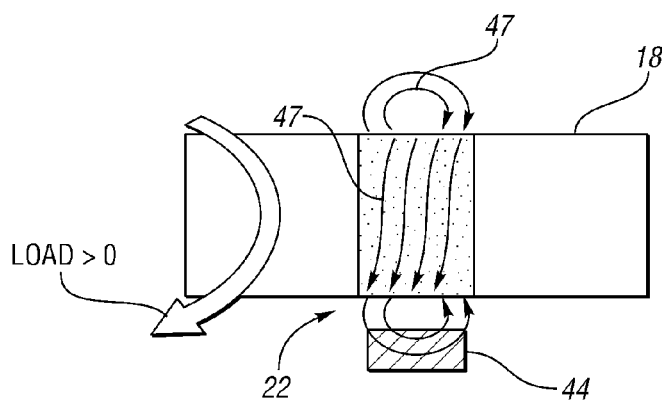
Figure 3C:
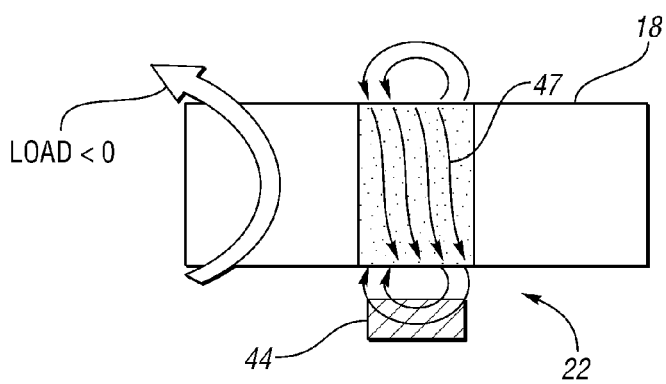

Referring now to FIGS. 3A, 3B, and 3C, an example of a magnetic torque sensor for detecting torque of a shaft will be described. This example assumes that the shaft is input shaft 18 and that the magnetic torque sensor is input shaft sensor 22.

Magnetic torque sensor 22 includes a magnetic flux sensing element(s) within a sensor housing 44. Input shaft 18 includes a magnetized region 46. Magnetized region 46 circumferentially extends around input shaft 18. Magnetized region 46 may be created by coating magnetized material as a thin layer on a chosen region of input shaft 18 or by magnetizing a region on the shaft. Sensor housing 44 is fixed in position adjacent to the magnetized region 46 of input shaft 18 to enable the sensing element to sense the torque induced signal.

Preferably, shaft 18 is made of steel having high Nickel content, preferably with Martensite structure at the surface layer. Shaft 18 is hardened to enable permanent magnetization. The chosen magnetized region 46 of shaft 18 is magnetized with magnetized material thereon to a designed depth from the surface within the hardened layer. A magnetic pattern or polarity signature may depend on a certain implementation of magneto-elastic torque sensing principles. However, they all require a magnetized region 46 of shaft 18 and a sensor housing 44 that contains one or more magnetic flux sensing elements. Sensor housing 44 may include other types of sensing elements such as thermo-couples.

At no load (FIG. 3A), magnetic flux 47 is contained near or within the shaft surface. The illustration in FIG. 3A shows a simplified view of flux direction. Depending on chosen magnetization patterns, magnetic flux may have more complex directional patterns.

When load is applied (i.e., input shaft 18 is twisted), magnetic flux 47 extends from the shaft surface and its axial component which is proportional to the applied torque is measured by the sensing element (FIGS. 3B and 3C). For instance, as shown in FIGS. 3B and 3C, magnetic flux 47 is realigned in one direction when the load is greater than zero and is realigned in the opposite direction when the load is less than zero. Either realignment causes more magnetic flux 47 to come out from the shaft surface in proportion to the load level. As indicated in FIGS. 3B and 3C, the sensing element detects the magnetic flux direction and intensity. Variations of this technology may include, for example, dual band and tri-band magneto-elastic torque sensors.

Figure 4:
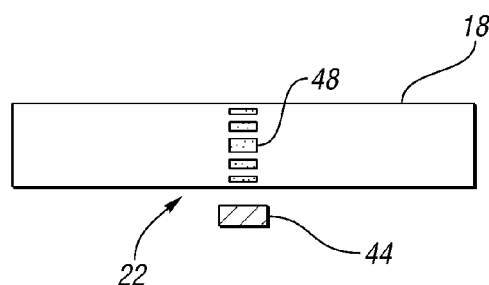
FIG. 4 illustrates an example of a magnetic speed sensor for detecting rotating speed of a shaft.

Referring now to FIG. 4, an example of a magnetic speed sensor for detecting rotating speed of a shaft will be described. Again, this example assumes that the shaft is input shaft 18 and that the magnetic speed sensor is input shaft sensor 22. Magnetic speed sensor 22 includes sensor housing 44 having magnetic flux sensing element. Input shaft 18 includes a magnetized region 48 comprised of magnetic material placed in spots repeatedly around the circumference of input shaft 18 as shown in FIG. 4. Sensor housing 44 is placed near the shaft surface, picking up the circumferential component of magnetic flux. A periodic voltage signal is generated on a magnetic spot as the rotating shaft 18 passes by the sensing element. The periodic voltage signal can be converted into a square wave signal using a comparator circuit which can then be converted into rpm by counting the number of square wave periods. Variations of this technology may include, for example, single band and dual band speed sensors.

For simplicity, a magnetic torque and/or speed sensor is referred to herein as a "magnetic torque sensor" or simply "sensor". However, as described above, such a magnetic torque sensor or sensor may be a magnetic torque sensor only, a magnetic speed sensor only, or a magnetic torque and speed sensor.

FIGS. 5A and 5B show a conventional front-wheel drive (FWD) automatic transmission 50 designed for volume production without a torque sensing mechanism. As seen in FIG. 5A, transmission 50 includes: a hydraulic flow passage 51 for applying a torque converter clutch (not shown); a hydraulic flow passage 52 for releasing the torque converter clutch; a hydraulic flow passage 53 for lubricating a bearing; and a hydraulic pump 54 driven by a chain. Hydraulic passages 51, 52, and 53 are illustrated in greater detail in the enlarged view of stator support 40 in FIG. 5B.

With the foregoing description in mind, various embodiments of the present invention will now be described.

Referring now to FIGS. 6A, 6B, 6C, and 6D, an automatic transmission 60 having a magnetic torque sensor packaging design in accordance with a first embodiment of the present invention will be described. FIG. 6A illustrates a cross-sectional view of transmission 60; FIG. 6B illustrates an enlarged view of the front side 41 of stator support 40 of transmission 60; FIG. 6C illustrates an enlarged view of sensor 22 of transmission 60; and FIG. 6D illustrates a cross-sectional view of the area of transmission 60 near one of sensor housings 44 of sensor 22.

A general aspect of the sensor packaging design in accordance with the first embodiment includes packaging sensor 22 features on the front side 41 of stator support 40 (i.e., the side of stator support facing toward torque converter 14).

As shown in FIGS. 6A and 6B, sensor 22 includes two sensor housings 44 each having a sensing element(s). Sensor housings 44 are placed in upper and lower windows 63 cut into the stator shaft 37 (i.e., the stator tube) of stator support 40 adjacent to magnetized region 46 of input shaft 18. A first press-fitted sleeve 61 seals the hydraulic passages of transmission 60 and retains sensor housings 44 from the inside surface of the stator shaft 37. A second press-fitted sleeve 62 retains sensor housings 44 from the outside surface of the stator shaft 37.

Each window 63 is a hollowed-out portion of the stator shaft 37 of stator support 40. As such, a sensor housing 44 into a window 63 is encased within the stator shaft 37 of stator support 40.

With reference to FIG. 5B, windows 63 are positioned within the stator shaft 37 of stator support 40 circumferentially away from hydraulic passages embedded in stator support 40.

To compensate for the effect of temperature on performance of sensor 22, the surface temperature of shaft 18 is preferably measured at the magnetized region. However, for practical reasons, the temperature in the surrounding environment of shaft 18 is usually measured, instead of directly measuring the surface temperature of shaft 18. Preferably, two temperature sensors are used. The first temperature sensor is integrated into the sealed upper window 63 of sensor housing 44 and reads air temperature inside of window 63. The local shaft surface temperatures are influenced by the heating effect of lube oil flowing around shaft 18 as well, which after being pumped, coursing through small labyrinths, and churning in a torque converter can significantly increase the oil's temperature. The second temperature sensor is used to measure lube oil temperature and is integrated into the lower window 63 of sensor housing 44. First sleeve 61 has an opening cut into its wall at the second temperature sensor integrated into the lower window 63, so that the second temperature sensor is exposed to the lube feed circuit and will thus read the temperature of the lube oil crossing over the input shaft surface.

First sleeve 61 is preferably made of at least two layers of magnetically permeable materials. One layer is a backing plate and the other layer is a bushing material. Both layers include magnetically permeable materials such as non-ferrous materials so that the sensing elements can sense through their walls. The backing plate includes stainless steel, bronze, or similar material. The backing material promotes hydraulic sealing and adds robustness to fatigue life under thermal gradients. The backing plate is coated with the second layer.

The second layer includes a bushing material. The bushing material and the backing plate material have similar coefficients of thermal expansion. The bushing material is strong enough to be pressed into position and to handle thermal cycles without crumbling. The bushing material at the internal diameter of first sleeve 61 supports shaft 18 on its journal surface. Sensor housings 44 are placed at an appropriate distance from the journal area of shaft 18 and the corresponding bushing area of first sleeve 61. This arrangement is to avoid mechanical work on the torque sensing surface and to prevent debris passing across the bushing journal be ground across the magnetic imprint on the shaft surface and impact the rotational signal uniformity of the signal of sensor 22. The distance between sensor housings 44 and the journal area of shaft 18 and the corresponding bushing area of first sleeve 61 minimizes the effect of local heating/loading non-uniformities on the sensor performance as well.

Second sleeve 62 can be made of magnetic shield material, such as mu metal or permalloy, to protect the sensing elements from external magnetic interference and reduce zero offset variation of the sensing elements. As indicated at 64, second sleeve 62 provides a bushing riding surface and provides an O-ring groove. As indicated at 65, second sleeve 62 can be extended axially for better electromagnetic shielding. Sensor wiring is glued or otherwise affixed inside of grooves in stator support 40 as indicated at 66. Second sleeve 62 covers the wiring at the OD. The end of the wiring extending out of stator support 40 includes a connector 67 for connection to the power-train control module. As such, second sleeve 62 may be used as a bushing surface on the outside and provide a continuous surface for a seal with the front side of stator support 40.

As indicated in FIG. 6B, the inner surface of second sleeve 62 may include micro-splines and the outer surface of the stator shaft 37 of stator support 40 may include micro-splines. As a result, second sleeve 62 may be micro-splined to the stator shaft 37 of stator support 40. This increases the ability to allow for a torsional path through second sleeve 62.

As indicated above, second sleeve 62 may be made of mu metal or other similar magnetic shield material. In this case, second sleeve 62 may be configured to have an overhang of equal distances from magnetized region 46 of input shaft 18 at both sides. Otherwise, if the mu metal or other magnetic shield material overhangs by a longer distance from magnetized region 46 at one side, then the sensor signal may be pegged.

In a variation of the sensor packaging design for transmission 60, four sensor windows 63 offset by 90 degrees are cut into the stator shaft 37 adjacent to magnetized region 46 of input shaft 18. Four magnetic torque sensors are respectively positioned within these four windows 63. This configuration enables circumferential signal non-uniformities of the sensors to be more efficiently cancelled out than a configuration having only two sensors spaced apart by 180 degrees around the stator shaft 37.

With reference to FIGS. 6B, 6C, and 6D, further aspects of the sensor packaging design for transmission 60 will be described. Windows 63 cut on stator shaft 37 of stator support 40 may be angled to allow press fit. The assembled location of first sleeve 61 is indicated at reference numeral 72. Stator support 40 includes on its front side a circumferential groove 74 for combining wiring 82 from sensor housings 44 together. Circumferential groove 74 connects with an axial groove running along the stator tube. Wiring 82 can be in the form of ribbon wires or can be embedded inside of a plastic lead frame with appropriate stiffness, or can be contained within some protective cover. Stator support 40 further includes on its front side a radial groove 77 connected to circumferential groove 74. Wiring 84 of sensors further extends along radial groove 77. A cover plate 75 for covering radial groove 77 is bolted onto the front side of stator support 40. Cover plate 75 covers wiring 84 at the top of radial groove 77 such that grooves 74 and 77 are protected during subsequent assembly into the transmission housing (the wiring may be in the form of ribbon wires and placed into a closed groove at the subassembly level, or contained within some protective cover). Alternatively, wiring 84 can be embedded inside of a plastic lead frame that sits inside radial groove 77. Also, wiring 82 inside circumferential groove 74 can be embedded in a plastic lead frame with appropriate stiffness that connects sensor housings 44 together forming a single plastic part with circumferential wiring 82, sensor housings 44, and radial wiring 84. During assembly, sensor housings 44 snap into their windows 63 on stator shaft 37 of stator support 40, and wirings 82 and 84 snap into their respective grooves 74 and 77. Wiring 84 extends out of stator support 40 from radial groove 77 as indicated at reference numeral 76.

As shown in FIG. 6C, a retainer clip 83 connects wiring 82 and 84 to sensor housings 44. As shown in FIG. 6D, sensor housing 44 and its window has a small angle taper to facilitate snap-in of parts as indicated at 85.

As described, features of the sensor packaging design described with reference to FIGS. 6A, 6B, 6C, and 6D include one or more sensors 22 being encased within the stator shaft 37 (i.e., the stator tube) of stator support 40. Accordingly, this sensor packaging design represents a design in which the stator shaft of the stator support of an existing transmission (such as described with reference to FIGS. 5A and 5B) may be retrofitted to include the hollowed-out containers 63 for sensors 22. Thus, the stator shaft of the stator support of an existing transmission does not have to be cylindrically recessed or the like to accommodate one or more sensors 22.

Referring now to FIGS. 7A and 7B, an automatic transmission 90 having a magnetic torque sensor packaging design in accordance with a second embodiment of the present invention will be described. FIG. 7A illustrates a cross-sectional view of transmission 90 and FIG. 7B illustrates an enlarged view of the rear side of stator support 40 of transmission 90. A general aspect of the sensor packaging design in accordance with the second embodiment includes sensor packaging features on the rear side of stator support 40 (i.e., the side of stator support 40 facing away from torque converter 14).

With reference to FIG. 7A, stator support 40 is made from two stator support parts 40a and 40b in order to allow the placement of sensor housing 44 into stator support 40 from the rear. Stator support parts 40a and 40b are bolted together by screws 91. A gasket 92 is provided between stator support parts 40a and 40b to provide sealing. Transmission 90 includes a hydraulic chamber 93 for lube flow. Sensor housing 44 is embedded in a plastic lead frame within a cavity of first stator support part 40a. A sleeve 61 retains sensor housing 44 from the inside. The sensing elements can read through sleeve 61. Only one sensor housing 44 is shown in the bottom position in FIG. 7A for illustrative purposes. One or more sensor housings 44 may be placed in single or multiple locations in the same or different planes. Sensor housing 44 is mounted to the rear face of stator support 40 by screws as indicated at 95.

With reference to FIG. 7B, as described, stator support 40 is made from two stator support parts 40a and 40b which are bolted together by screws 91, with a gasket 92 (not shown in FIG. 7B) applied between the stator support parts at their parting line. Stator support part 40b does not carry high loads. This design enables easy assembly and disassembly (the entire stator support 40 does not need to be removed from the transmission housing in order to replace sensor 22, only stator support part 40b needs to be removed). Holes for a torque converter release channel are drilled in stator support part 40a and a small chamber is milled at the parting line to connect the hydraulic flow path of the drilled holes as indicated at 94. Making these chambers smaller provides more space for the sensors and the screws. Holes for a torque converter apply channel are drilled in stator support part 40a and a small chamber is milled at the parting line to connect the hydraulic flow path of the drilled holes as indicated at 96. A small hydraulic chamber (not shown) is milled in the bottom of stator support part 40b for bearing lube flow. Sensor housing 44 is embedded in a plastic lead frame and snaps into a cast cavity of first stator support part 40a of stator support 40. The sensing elements can read through sleeve 61 which is made of magnetically permeable non-ferrous material and is inserted at the ID of stator support 40. The sensor wiring is embedded in the same plastic lead frame and is routed inside of a groove on the rear side of stator support part 40a as indicated at 97.

Figure 8:
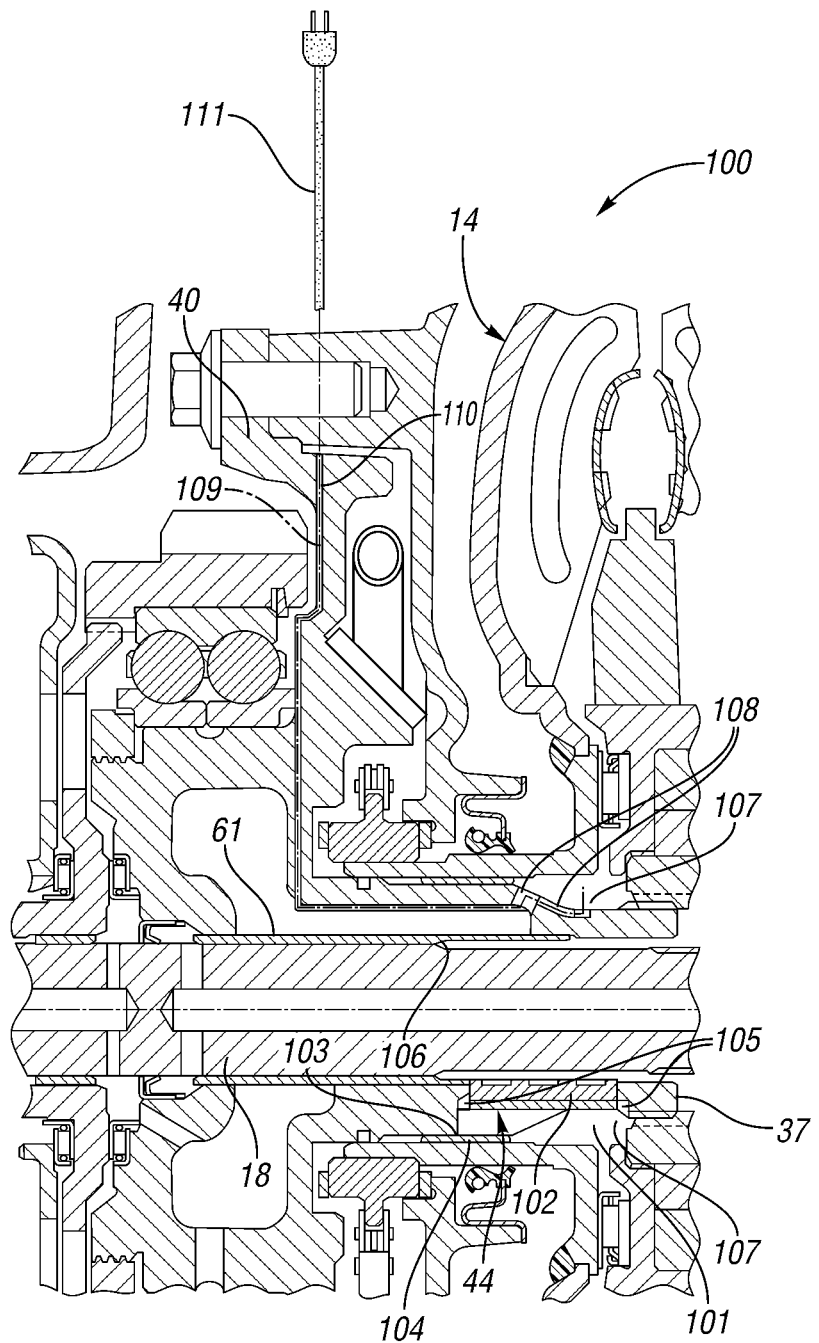
FIG. 8 illustrates a cross-sectional view of an automatic transmission having a magnetic torque sensor packaging design in accordance with a third embodiment of the present invention.

Referring now to FIG. 8, an automatic transmission 100 having a magnetic torque sensor packaging design in accordance with a third embodiment of the present invention will be described. FIG. 8 illustrates a cross-sectional view of transmission 100. A general aspect of the sensor packaging design in accordance with the third embodiment includes sensor packaging features on the front side 41 of stator support 40.

As shown in FIG. 8, a shortened spline 101 is provided. Slots are cut into stator shaft 37 of stator support 40 at single or multiple positions as indicated at 102 (six o'clock position is just for illustrative purposes). A fillet 103 is provided to avoid damaging bushing 104. Bushing 104 should be press-fitted onto stator shaft 37 of stator support 40 and should not rotate relative to the stator support. Sensor housing 44 is fixed by screws to stator shaft 37 of stator support 40 as indicated at 105. Sensor housing 44 should withstand 120 psi and oil temperatures of 350 F to 400 F (the pressure blow off valve is set at 165 psi and heavy towing can impinge 400F). The ID of the sleeve 61 is changed to the same as the ID of stator shaft 37 of stator support 40 as indicated at 106. The sleeve 61 is pressed in after the sensor wiring is routed. A circumferential groove for the wiring is milled on stator shaft 37 of stator support 40 as indicated at 107. A groove is milled to feed the wiring through the apply pressure port of torque converter 14 as indicated at 108. Holes 109 are drilled in stator support for the wiring. The wiring is glued or otherwise affixed and/or sealed in place. A radial groove for the wiring is milled on the front side of stator support 40 as indicated at 110. The wiring is routed to a connector at the transmission case as indicted at 111.

Figure 9:
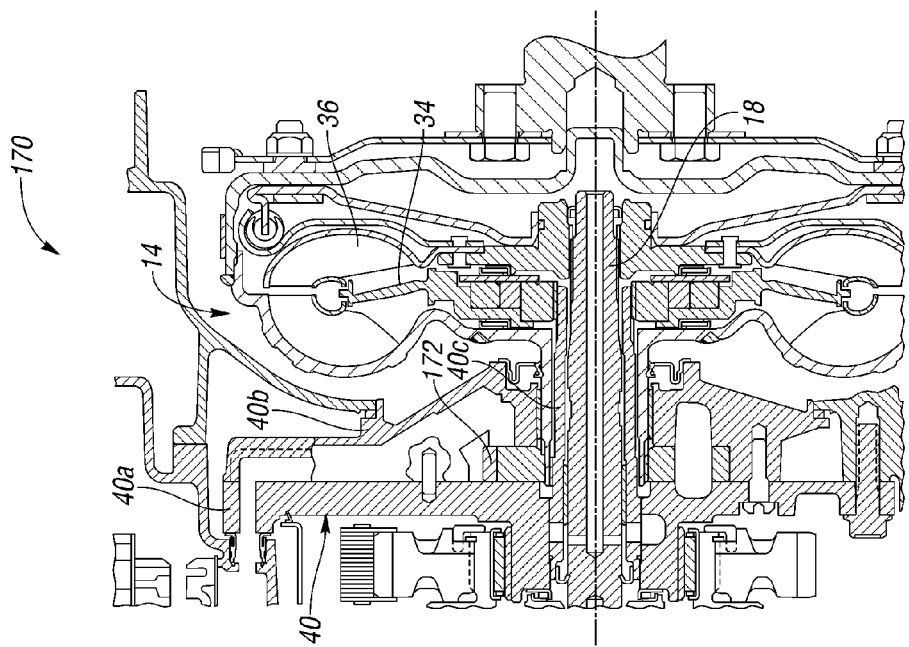
FIG. 9 illustrates a cross-sectional view of another conventional FWD automatic transmission in which the input shaft area of the transmission lacks torque sensing mechanisms.

Referring now to FIG. 9, another conventional FWD automatic transmission 170 in which the input shaft area of the transmission lacks any torque sensing mechanisms will be described. Stator support 40 is assembled from three portions 40a, 40b, and 40c. Hydraulic channels are between stator support portions 40a, 40b, and 40c. Stator support hosts the in-axis pump gear 172.

Figure 10:
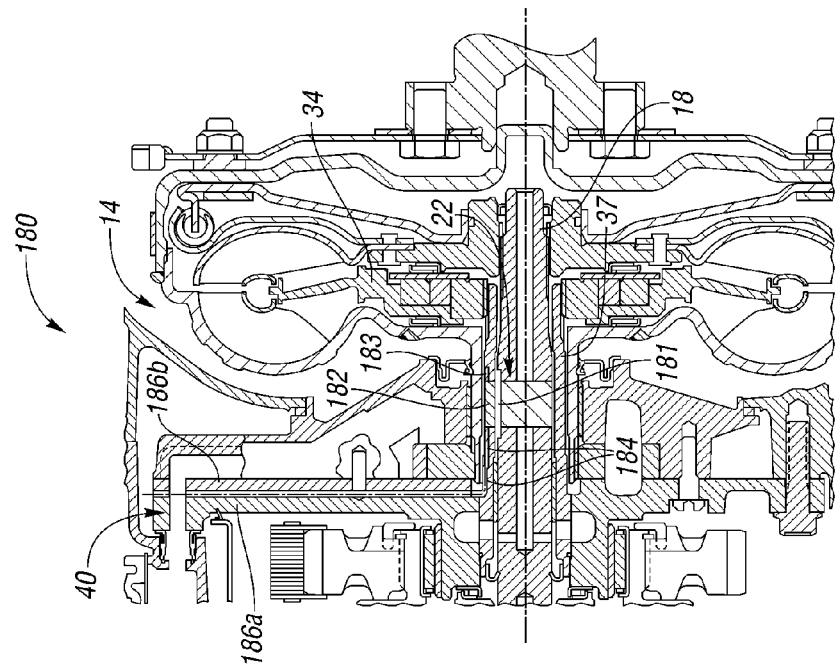
FIG. 10 illustrates a cross-sectional view of an automatic transmission which corresponds to the transmission shown in FIG. 9 but having a magnetic torque sensor packaging design in accordance with a fourth embodiment of the present invention.

Referring now to FIG. 10, an automatic transmission 180 which corresponds to transmission 170 shown in FIG. 9 but has a magnetic torque sensor packaging design in accordance with a fourth embodiment of the present invention will be described. As shown in FIG. 10, the diameter of input shaft 18 is straightened at the region of sensor 22 as indicated at 181. A window 182 for each sensor 22 is cut (at single or multiple locations with offset) on stator shaft 37 of stator support 40. The sensor housing is mounted in place via screws as indicated at 183. The sensor wiring is inside a groove of stator support 40 as indicated at 184. Stator support 40 is split into two parts 186a and 186b. The wiring runs in a groove between stator support parts 186a and 186b as indicated at 185. Stator support part 186b can be made as a ten to fifteen degree segment (i.e., not present all around) at any appropriate circumferential location. The wiring is inside the groove between stator support parts 186a and 186b. Subsequently, stator support parts 186a and 186b are bolted together. Stator support 40 includes a circumferential groove (not shown) to route the wiring between different sensors 22.

Referring now to FIGS. 11A and 11B, with continual reference to FIGS. 6A through 6D, an automatic transmission 190 having a magnetic torque sensor packaging design in accordance with a fifth embodiment of the present invention will be described. FIG. 11A illustrates a cross-sectional view of transmission 190 and FIG. 11B illustrates an enlarged view of the front side of stator support 40 of transmission 190.

A general aspect of the sensor packaging design in accordance with the fifth embodiment includes sensor packaging features on the front side of stator support 40. In general, transmission 190 is similar to transmission 60 described with reference to FIGS. 6A through 6D with the exception that stator support 40 of transmission 190 includes more complex hydraulic fluid pathways than stator support 40 of transmission 60.

With reference to FIGS. 11A and 11B, sensor windows 63 for single or multiple sensor housings 44 are machined on stator shaft 37 at the front side of stator support 40 at an offset as indicated at 191. Only one sensor 22 is shown in FIG. 11A for illustration simplicity. A first sleeve 192 retains sensor housing 44 from the inside. One window is cut on first sleeve 192 at the location of temperature sensor integrated into bottom sensor window 191, in order to expose the temperature sensor to the lube oil. First sleeve 192 is non-ferrous such that the sensing element can read through its wall. Grooves are milled into stator support 40 for receiving the sensor wiring as indicated at 193. A second press-fitted sleeve 194 retains sensor housing 44 from the outside. As indicated at 195, second sleeve 194 provides a bushing and seal riding surface and covers sensor housing 44 and the wiring. As indicted at 196, the wiring can be contained within some protective cover, embedded in a plastic lead frame with appropriate stiffness or a ribbon wire can be used with a metallic cover plate that covers the wiring and closes off and seals the groove.

With reference to FIG. 11B, the front side of stator support 40 includes a plurality of hydraulic channels 197. The locations of hydraulic channels 197, bolt holes 198 for mounting stator support 40, sensor windows 63, circumferential wiring groove 199 on the front side of stator support 40, and radial wiring groove 200 on the front side of stator support 40 are arranged as shown in FIG. 11B. Again, circumferential groove 199 combines the wiring from sensor windows 63 and radial groove 200 leads the wiring out of stator support 40. A cover plate 75 is mounted on the front side of stator support 40 over radial groove 200 to protect the wiring during subsequent assembly processes. In other respects, stator support 40 described with reference to FIGS. 11A and 11B carries all the features of stator support 40 described with reference to FIGS. 6A through 6D.

Figure 12:
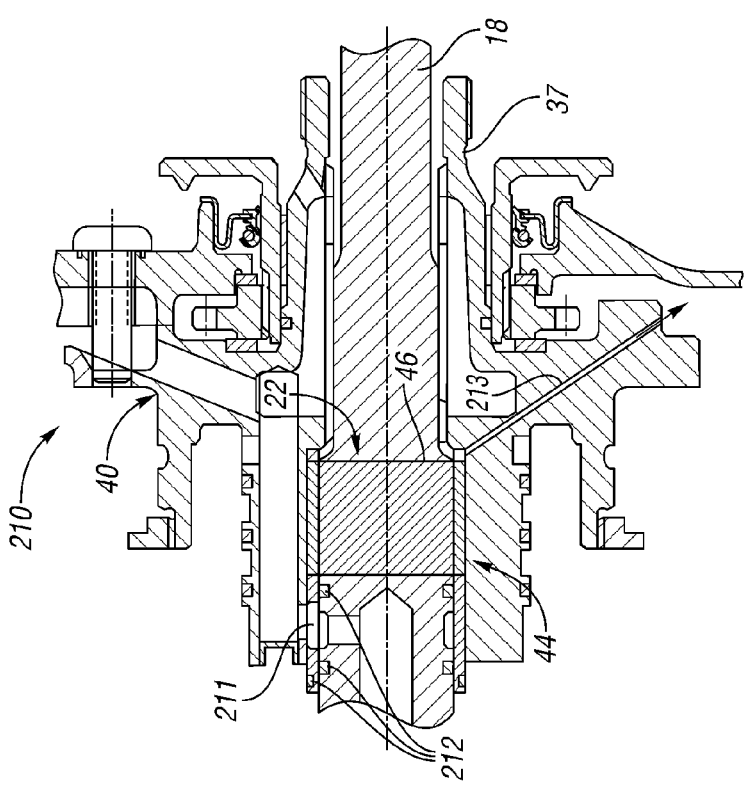
FIG. 12 illustrates a cross-sectional view of an automatic transmission having a magnetic torque sensor packaging design in accordance with a sixth embodiment of the present invention.

Referring now to FIG. 12, an automatic transmission 210 having a magnetic torque sensor packaging design in accordance with a sixth embodiment of the present invention will be described. A general aspect of the sensor packaging design in accordance with the sixth embodiment includes sensor packaging features on the rear side of stator support 40 with stator support 40 including complex hydraulic fluid pathways like stator support 40 shown in FIG. 11B.

As shown in FIG. 12, a 360 degree bobbin (i.e., sensor housing 44) of sensor 22 is mounted from the rear side by press fitting inside stator support 40 as indicated at 211. To this end, there is no need for screws and the radial dimensions of stator support 40 may need adjustments to ensure appropriate wall thickness. The bobbin provides sealing surface for O-rings as indicated at 212. The sensor wiring is routed through a hole drilled in stator support 40 as indicated at 213.

Figure 13:
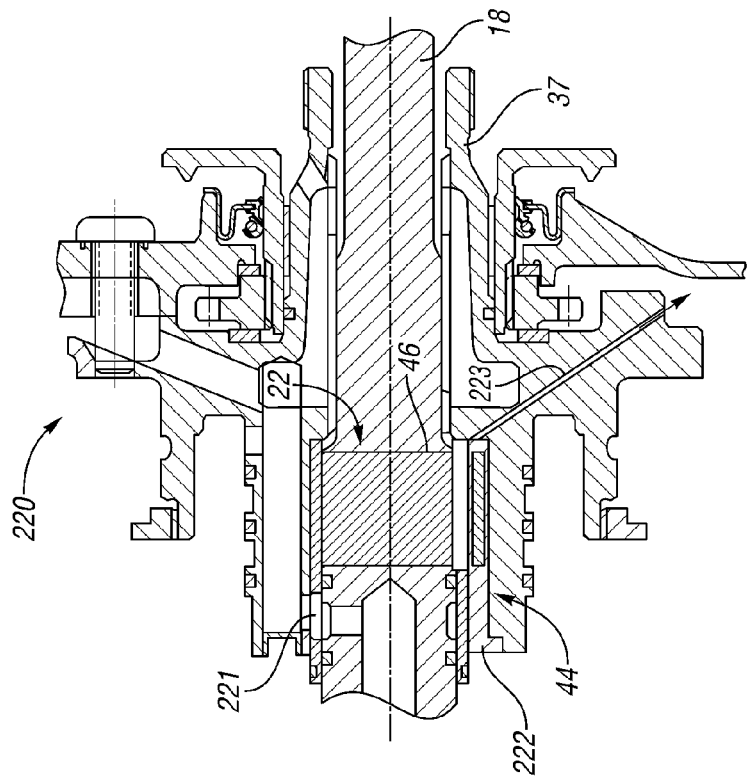
FIG. 13 illustrates a cross-sectional view of an automatic transmission having a magnetic torque sensor packaging design in accordance with a seventh embodiment of the present invention.

Referring now to FIG. 13, an automatic transmission 220 having a magnetic torque sensor packaging design in accordance with a seventh embodiment of the present invention will be described. A general aspect of the sensor packaging design in accordance with the seventh embodiment includes sensor packaging features on the rear side of stator support 40 with stator support 40 including complex hydraulic fluid pathways like stator support 40 shown in FIG. 11B.

As shown in FIG. 13, a cavity is casted for the sensing element of sensor 22 at the location of sensor housing 44 as indicated at 221. The sensing element will read through this cavity opening. An axial hole for sensor housing 44 is provided at the rear side of stator support 40 as indicated at 222. Sensor housing 44 is inserted into this circular hole. Single or multiple sensor locations may be around the circumference. No sealing surface is provided for sensor housing 44. There is a relatively large radial distance between the sensing element and shaft 18. The sensor wiring is routed through a hole drilled in stator support 40 as indicated at 223.

Figure 14:
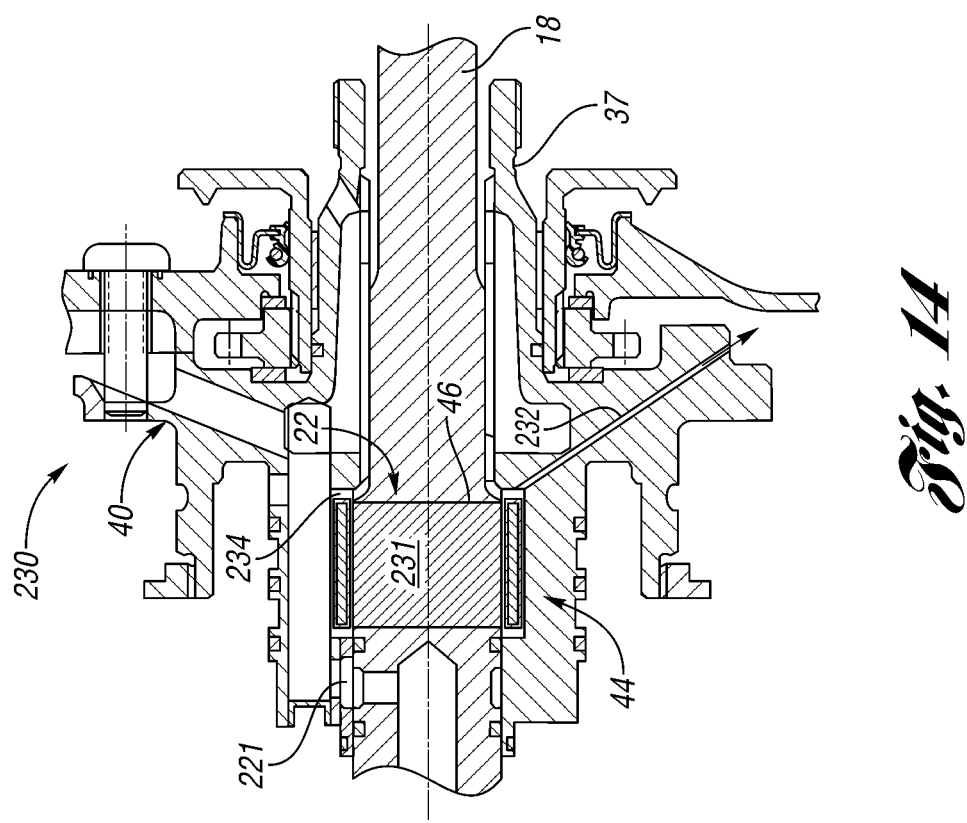
FIG. 14 illustrates a cross-sectional view of an automatic transmission having a magnetic torque sensor packaging design in accordance with an eighth embodiment of the present invention.

Referring now to FIG. 14, an automatic transmission 230 having a magnetic torque sensor packaging design in accordance with an eighth embodiment of the present invention will be described. A general aspect of the sensor packaging design in accordance with the eighth embodiment includes sensor packaging features on the rear side of stator support 40 with stator support 40 including complex hydraulic fluid pathways like stator support 40 shown in FIG. 11B.

As shown in FIG. 14, sensor housing 44 snaps into a 360 degree machined cavity 234 as indicated at 231. Sensor housing 44 is compressed radially before being installed from the rear side. Single or multiple sensor locations may be around the circumference. No sealing surface is provided for sensor housing 44. Radial dimensions of stator support 40 may need adjustments to ensure appropriate wall thickness. The sensor wiring is routed through a hole drilled in stator support 40 as indicated at 232.

Referring now to FIG. 15, an automatic transmission 240 having a magnetic torque sensor packaging design in accordance with a ninth embodiment of the present invention will be described. A general aspect of the sensor packaging design in accordance with the ninth embodiment includes sensor packaging features on the front side of stator support 40 with stator support 40 including complex hydraulic fluid pathways like stator support 40 shown in FIG. 11B. As shown in FIG. 15, a 360 degree sensor housing 44 is inserted into stator shaft 37 of stator support 40 from the front side as indicated at 241. The sensor wiring is routed through a hole drilled in stator support 40 as indicated at 242.

Referring now to FIG. 16, an automatic transmission 250 having a magnetic torque sensor packaging design in accordance with a tenth embodiment of the present invention will be described. A general aspect of the sensor packaging design in accordance with the tenth embodiment includes sensor packaging features on the front side of stator support 40 with stator support 40 including complex hydraulic fluid pathways like stator support 40 shown in FIG. 11B. As shown in FIG. 16, sensor housing 44 is inserted into a notch machined on stator shaft 37 at the front side of stator support 40 as indicated at 251. Again, there may be single or multiple sensor housings around the circumference of stator shaft 37. The bushing should not rotate relative to stator shaft 37 of stator support 40 as indicated at 252. The sensor wiring is routed through a hole drilled in stator support 40 as indicated at 253.

As described, embodiments of the present invention are directed to designs for packaging magneto-elastic torque sensors in automatic transmissions for volume production. Various features applicable to one or more of the embodiments include the following. A region of the transmission input shaft located inside of a torque converter stator support is magnetized. The torque converter stator support includes a housing of magnetic flux sensors (which may also be referred to as a bobbin, sensor housing, or PC board). The sensor housing includes one or more magnetic flux sensing elements such as flux gates. The sensor housing may include other sensors such as a temperature sensor. Electrical wiring which may be bound as a ribbon or other appropriate shape is attached to the sensor housing. The wiring is routed out to the outside of transmission case through unique pathways designed into the stator support and its surrounding components. The stator support is uniquely divided into multiple sections to enable the placement of the sensor housing and the wiring. A cover plate is placed on a set of the wiring and is attached to the stator support assembly for protecting the wiring. Unique placement of the sensor housing enables the stator support assembly to maintain multiple hydraulic pathways within itself for various hydraulic control functions. Unique placement of the sensor housing enables a tightly controlled spacing variability between the magnetized region of the shaft and the sensor housing.

As can be appreciated, the features of the present invention are applicable to other types of vehicular transmissions that contact a similar geometric layout around a magnetized shaft.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   an input shaft having a magnetized region;
   a stator tube including an inner surface encompassing the shaft, an outer surface, and a portion of the stator tube adjacent to the magnetized region including a cavity extending between and through the surfaces of the stator tube;
   a magnetic torque sensor, for detecting torque of the input shaft, positioned within the cavity between the surfaces of the stator tube adjacent to the magnetized region.

2. The transmission of claim 1 further comprising:
   a sleeve extending between the inner surface of the stator tube and the input shaft for retaining the sensor in place.

3. The transmission of claim 2 wherein:
   the sleeve includes at least two layers of magnetically permeable non-ferrous materials pressed together to allow the sensor to read magnetic signals through the sleeve.

4. The transmission of claim 3 wherein:
   the first layer is a backing plate and the second layer includes a bushing material, wherein the first and second layers have a similar coefficient of thermal expansion.

5. The transmission of claim 1 further comprising:
a sleeve extending along the outer surface of the stator tube for retaining the sensor in place.

6. The transmission of claim 5 wherein:
the sleeve contains a magnetic shielding material.

7. The transmission of claim 5 wherein:
the sleeve includes micro-splines on an inner surface thereof and the outer surface of the stator tube includes micro-splines such that the sleeve may be micro-splined to the outer surface of the stator tube and thereby provide a torsional path through the sleeve.

8. The transmission of claim 5 wherein:
the sleeve forms a bushing surface on an outer surface thereof.

9. The transmission of claim 5 further comprising:
a stator support;
wherein the stator tube extends from a side of the stator support;
wherein the sleeve includes a sealing surface for sealing between the side of the stator support and the stator tube.

10. The transmission of claim 5 wherein:
the outer surface of the stator tube includes at least one of an axial groove and a circumferential groove;
wherein the sleeve covers the at least one of the axial groove and the circumferential groove.

11. The transmission of claim 1 further comprising:
a first sleeve extending between the inner surface of the stator tube and the input shaft for retaining the sensor in place; and
a second sleeve extending along the outer surface of the stator tube for retaining the sensor in place.

12. The transmission of claim 11 wherein:
at least one of the sleeves is press-fitted into place.

13. The transmission of claim 1 wherein:
the outer surface of the stator tube includes an axial groove and a circumferential groove;
wherein wiring of the sensor runs within the axial and circumferential grooves.

14. The transmission of claim 13 further comprising:
a stator support;
wherein the stator tube extends from a side of the stator support;
wherein the side of the stator support includes a radial groove;
wherein the wiring extends from the circumferential groove to within the radial groove and out of the stator support.

15. The transmission of claim 1 further comprising:
a stator support;
wherein the stator tube extends from a side of the stator support;
wherein the sensor is positioned circumferentially opposite from hydraulic passages of the stator support.

16. A transmission comprising:
a stator tube including an inner surface encompassing an input shaft having a magnetized region, an outer surface, and a portion of the stator tube adjacent to the magnetized region including a cavity extending between and through the surfaces of the stator tube; and
a magnetic torque sensor, for detecting torque of the input shaft, positioned within the cavity between the surfaces of the stator tube adjacent to the magnetized region.

17. The transmission of claim 16 further comprising:
a sleeve extending between the inner surface of the stator tube and the input shaft, wherein the sleeve retains the sensor within the cavity.

18. A transmission comprising:
a first stator support part including an inner surface encompassing an input shaft having a magnetized region, an outer surface, and a portion of the stator tube adjacent to the magnetized region including a cavity extending between and through the surfaces of the stator tube;
a second stator support part including an inner surface encompassing the input shaft, wherein the second stator support part is attachable to a rear side of the first stator support part; and
a magnetic torque sensor, for detecting torque of the input shaft, positioned within the cavity between the surfaces of the stator tube adjacent the magnetized region.

19. The transmission of claim 18 further comprising:
a sleeve extending between the inner surface of the first stator support part and the input shaft, wherein the sleeve retains the sensor within the cavity.

20. The transmission of claim 18 wherein:
the sensor is insertable from the rear side of the first stator support part into the cavity when the second stator support part is detached from the first stator support part.

21. The transmission of claim 18 wherein:
the sensor is attachable to the second stator support part when the second stator support part is attached to the first stator support part.

22. The transmission of claim 18 wherein:
the rear side of the first stator support part includes a circumferential groove and a radial groove;
wherein wiring for the sensor extends from the sensor to within the circumferential groove, to within the radial groove, and out of the first stator support part.

23. The transmission of claim 18 wherein:
the first stator support part includes hydraulic passages extending between the rear side and the inner surface of the first stator support part.

24. A transmission comprising:
a stator tube having an inner surface and an outer surface, the stator tube encompassing an input shaft having a magnetized region with the inner surface facing the input shaft, the stator tube further having a cut-out portion adjacent the magnetized region and extending between the outer and inner surfaces; and
a magnetic torque sensor, for detecting torque of the input shaft, positioned within the cut-out portion between the surfaces of the stator tube and affixed to the stator tube to be adjacent the magnetized region.

25. The transmission of claim 24 further comprising:
a first sleeve extending between the inner surface of the stator tube and the input shaft, wherein the first sleeve retains the sensor in place at the inner surface of the stator tube.

26. The transmission of claim 25 further comprising:
a second sleeve extending along the outer surface of the stator tube, wherein the second sleeve retains the sensor in place at the outer surface of the stator tube.

* * * * *